US008643667B2

(12) United States Patent
Alessi et al.

(10) Patent No.: US 8,643,667 B2
(45) Date of Patent: Feb. 4, 2014

(54) METHOD OF DISPLAYING COMIC BOOKS AND SIMILAR PUBLICATIONS ON A COMPUTER

(75) Inventors: Mark A. Alessi, Odessa, FL (US); Alberto Gabriel Mendoza Padial, Tampa, FL (US); H L Courtland Whited, Tampa, FL (US)

(73) Assignee: Disney Enterprises, Inc., Burbank, CA (US)

( * ) Notice: Subject to any disclaimer, the term of this patent is extended or adjusted under 35 U.S.C. 154(b) by 986 days.

(21) Appl. No.: 10/342,159

(22) Filed: Jan. 14, 2003

(65) Prior Publication Data

US 2004/0021673 A1 Feb. 5, 2004

Related U.S. Application Data

(60) Provisional application No. 60/400,508, filed on Aug. 2, 2002.

(51) Int. Cl.
*G09G 5/00* (2006.01)
(52) U.S. Cl.
USPC ........... 345/619; 345/621; 345/625; 345/629; 345/660; 345/665
(58) Field of Classification Search
USPC ......... 345/619, 621, 625, 629, 660, 655, 665, 345/589–600, 611, 616, 29; 715/764
See application file for complete search history.

(56) References Cited

U.S. PATENT DOCUMENTS

| | | | | |
|---|---|---|---|---|
| 5,742,779 A | * | 4/1998 | Steele et al. | 715/839 |
| 5,872,573 A | * | 2/1999 | Adegeest | 345/621 |
| 5,943,049 A | * | 8/1999 | Matsubara et al. | 715/715 |
| 6,121,960 A | * | 9/2000 | Carroll et al. | 345/173 |
| 6,155,923 A | * | 12/2000 | Stephens et al. | 463/1 |
| 6,157,733 A | * | 12/2000 | Swain | 382/154 |
| 6,388,665 B1 | * | 5/2002 | Linnett et al. | 345/473 |
| 6,486,890 B1 | * | 11/2002 | Harada et al. | 345/660 |
| 6,704,034 B1 | * | 3/2004 | Rodriguez et al. | 715/860 |
| 2001/0039000 A1 | * | 11/2001 | Parsons | 434/166 |
| 2002/0039114 A1 | * | 4/2002 | Feathers et al. | 345/738 |
| 2002/0054121 A1 | * | 5/2002 | Seng | 345/776 |
| 2002/0087555 A1 | * | 7/2002 | Murata | 707/10 |
| 2002/0112180 A1 | * | 8/2002 | Land et al. | 713/200 |
| 2002/0122039 A1 | * | 9/2002 | Minagawa et al. | 345/473 |

(Continued)

FOREIGN PATENT DOCUMENTS

JP 2000148341 A * 5/2000

OTHER PUBLICATIONS

"comicsontheweb.com v.2 instructions", Http://www.comicsontheweb.com/common_files/instructions/v2/default.asp.*

(Continued)

*Primary Examiner* — Jwalant Amin
(74) *Attorney, Agent, or Firm* — Ference & Associates LLC

(57) ABSTRACT

In a method for displaying an illustrated book on a computer screen, a graphics image, corresponding to a page in the illustrated book, is displayed on the computer screen. A text detail image is displayed on the computer screen, the text detail image is displayed as a layer on the top of the graphics image. A cursor rolling over the text detail image is detected. A magnified image of the text detail image is displayed when the cursor has rolled over the text detail image.

21 Claims, 9 Drawing Sheets

(56) References Cited

U.S. PATENT DOCUMENTS

| | | | |
|---|---|---|---|
| 2002/0122197 A1* | 9/2002 | Abir | 358/1.11 |
| 2002/0194194 A1* | 12/2002 | Fenton et al. | 707/104.1 |
| 2003/0025724 A1* | 2/2003 | Ullmann et al. | 345/707 |
| 2003/0046082 A1* | 3/2003 | Siegel | 704/270 |
| 2003/0052900 A1* | 3/2003 | Card et al. | 345/660 |
| 2003/0068088 A1* | 4/2003 | Janakiraman et al. | 382/229 |
| 2003/0095139 A1* | 5/2003 | Davidsson | 345/700 |
| 2003/0210273 A1* | 11/2003 | Yonemura | 345/776 |
| 2004/0080541 A1* | 4/2004 | Saiga et al. | 345/805 |
| 2005/0114796 A1* | 5/2005 | Bast | 715/856 |

OTHER PUBLICATIONS

"Changing the Font Size on the Fly". Shiran, Yehuda. Aug. 21, 2000. Retrieved from archive.org for verified date.*

* cited by examiner

METHOD OF DISPLAYING COMIC BOOKS AND SIMILAR PUBLICATIONS ON A COMPUTER

CROSS-REFERENCE TO A RELATED PROVISIONAL PATENT APPLICATION

The present application claims priority on U.S. Provisional Patent Application Ser. No. 60/400,508, filed Aug. 2, 2002, the entirety of which is incorporated herein by reference.

BACKGROUND OF THE INVENTION

1. Field of the Invention

The invention relates to information publishing and more specifically, relates to interactive information display on a computer screen.

2. Description of the Prior Art

Computer publishing has become a widely accepted way to display information to end-users. There are two major ways to convey information to the end users through a computer system: static display and dynamic display. The static display is similar to traditional newspaper, where the information is displayed page by page on a monitor screen. The dynamic display uses video capabilities of the computer system, where the information is compiled into a video file and later played on a monitor screen.

The static display usually involves downloading information and displaying to the user. All information is usually in one huge file, or at most in two files: one for text information one for graphical information. Usually the information is displayed visually and in one language.

The dynamic display involves downloading video information, usually in a large file. Generally, a user does not have much control over the display of a video file, except for basic mechanic commands such as starting, stopping, and pausing. These controls do not alter the presentation of the displayed material.

For more sophisticated applications, such as on-line comic books or digital instruction manuals, the traditional static display or video display are not adequate. Generally, existing methods of displaying serialized books involve downloading and storing the complete book on the user's computer in a single event. The user then must read the book "as-is" without having the ability to change the book, except for the magnification of all of the book's text. However, in certain kinds of books, such as comic books, the text might appear too small for comfortable reading and, when the user zooms in on the display to facilitate reading the text, much of the comics' graphics are zoomed off of the screen. This causes the user to go back and forth between zooming in and zooming out of the image, which is time consuming and irritating to the user.

Other methods of displaying books download only a single page at a time. The user of this method, upon finishing the reading of a page of the book, is forced to wait for a substantial period of time for a subsequent page to download.

Therefore, there is a need for a method of displaying comic books and similar publications on a computer that allows temporary magnification of the text while preserving the image of the graphics.

There is also a need for a method of displaying comic books and similar publications in which a subsequent page is downloaded to the user prior to the user finishing the reading of an initial page.

SUMMARY OF THE INVENTION

The disadvantages of the prior art are overcome by the present invention which, in one aspect, is a method for displaying an illustrated book on a computer screen, in which a graphics image, corresponding to a page in the illustrated book, is displayed on the computer screen. A text detail image (word balloon) is displayed on the computer screen. The text detail image is displayed as a layer on the top of the graphics image A cursor rolling over the text detail image is detected. A magnified image of the text detail image is displayed when the cursor has rolled over the text detail image.

In another aspect, the invention is a method for displaying a book on a computer screen, in which a first graphics image, corresponding to a first page in the book, is displayed on the computer screen. A text detail image is displayed on the computer screen. The text detail image is displayed as a layer on the top of the first graphics image. A portion of an audio file corresponding to the text detail image in the first page of the book is played on an audio device. The audio file is a narrative of the book.

In another aspect; the invention is a method for displaying a serial comic book on a computer screen, in which a comics image about the comics story is displayed on the computer screen. A summary feature button along the comics image is on the computer screen and a summary of the comics story up to the comics image is displayed upon detecting activation of the summary feature button.

In another aspect, the invention is a method for displaying a comic book on a computer screen in which a comics image about the comics story is displayed on the computer screen. A biography feature button along the comics image is displayed on the computer screen. Activation of the biography feature button is detected. Biographies of characters in the comics story are displayed when the biography feature button is activated.

In yet another aspect, the invention is a method for displaying a comic book, including a predetermined number of pages, on a computer that is in communication with a global computer network that is in communication with a server. A first selected number of pages, having a first page and a last page, of the predetermined number of pages is downloaded from the server to the computer. The first selected number is less than the predetermined number. The first selected number of pages is displayed in sequence from the first page to the last page. A second selected number of pages of the predetermined number of pages is downloaded from the server when a page of the first selected number of pages within a predetermined range of the last page of the first selected number of pages has been displayed.

The invention introduces a system and methods for publishing digital information using a computing device in communication with a computer network. The digital information resides on a storage device on the computer network and is downloaded to the computing device as it is needed for displaying. Optionally, the digital information may be loaded from a compact disk read only memory disk (CD ROM). The digital information is separated into different files and they can be displayed separately.

According to one embodiment of the present invention, the digital information is a comic book. The comic book is displayed on a display screen sequentially, page by page. The comic book is downloaded sequentially from the storage device. The digital information for each display page is separated into different files, and these files can be displayed independently from other files. For example, the user can select to view the comic book in black and white display, and the system will not display the color file. If the user selects to view in color, then the color file will be displayed on the top of the black and white image.

The dialogs are displayed in traditional dialog balloons. These dialog balloons can be enlarged for easy reading by simply placing a cursor on the top of selected dialog balloons. The enlargement of the selected balloon does not affect the underlying graphics display. The user can modify the size of dialog balloons and the speed that a dialog balloon changes its appearance. The user can also select to have dialogs displayed in the audio format, and the system will "read" out loud the selected dialog on a speaker. The user can select the volume that a dialog is played by the speaker, and the user can optionally change the selected dialog to a different language.

The user need not to read the comic story sequentially; the user can jump to any page. After jumping to a particular page, the user can learn about the story up to that point by using the "story up to this point" feature. The system also provides a synopsis feature, so the user can have a general idea about the comic story. The user can also learn about each individual character in the story by using the character's biographical information feature. The user can also learn about the creators of the comic story by using the credit feature and the information about the creators will be displayed.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
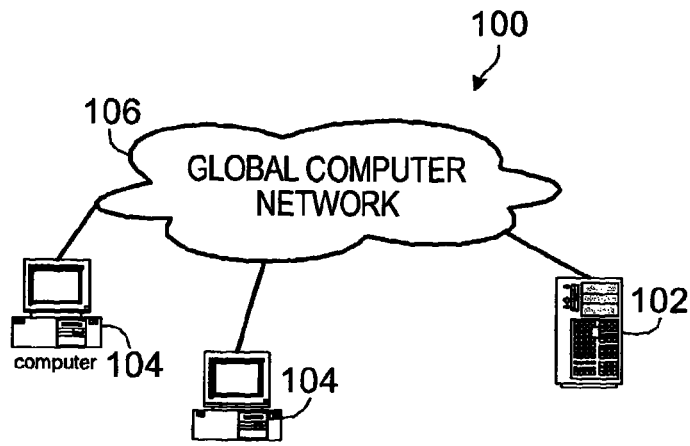
FIG. 1 is a block diagram showing a network architecture that would support one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

Referring now in detail to the figures, where like numerals refer to like elements throughout the several views, FIG. 1 depicts architecture 100 of a network supporting the present invention. In one embodiment, the invention is a mechanism for displaying a comic book via the global computer network. The digital information for publishing the comic book is stored in a server 102 in communication with the global computer network 106. The server 102 may be a dedicated computer, and the global computer network 106 may be a high speed data network, such as the Internet. The digital information can be downloaded via the computer network 106 to an end user's computers 104 in response to a request received from the end user.

Figure 2:
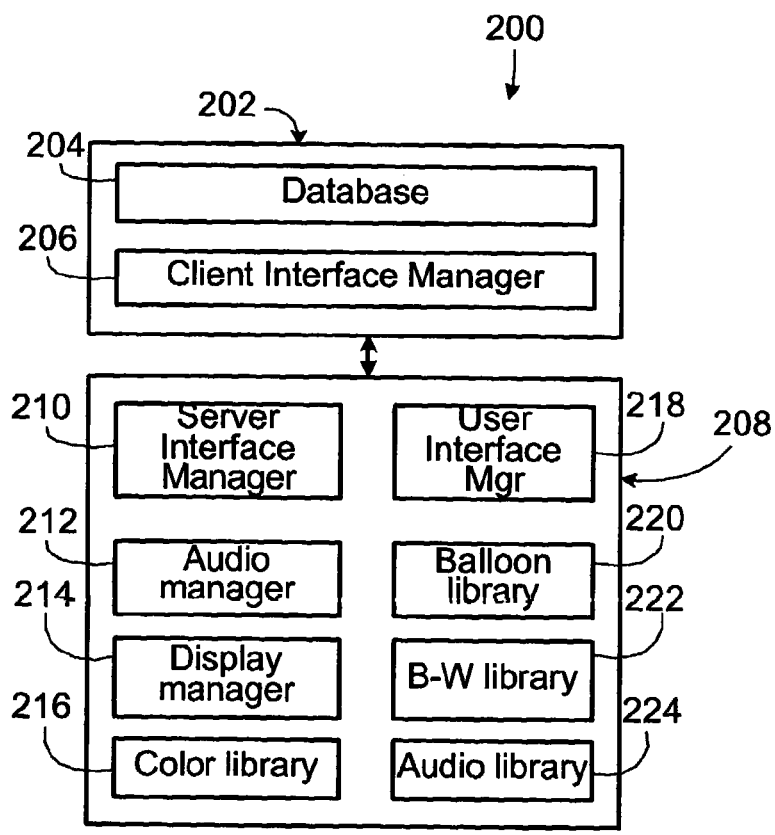
FIG. 2 is a is a block diagram showing server and client interface management in one embodiment of the invention.

FIG. 2 illustrates an architecture 200 of an exemplary embodiment. The digital information publishing system of the invention may be architected in a client-server configuration. The server component 202 has a client interface manager 206 and a database 204 of digital information. The client component 208 has a server interface manager 210, an audio manager 212, a display manager 214, a user interface manager 218, a color library 216, a balloon library 220, a black-and-white library 222, and an audio library 224.

The server component 202 resides generally on the server 102. The database 204 is stored in a storage device on the server 102, and the client interface manager 206 is a software program running on the server 102. The client interface manager 206 interfaces with the client component 208 that may be running on a remote computer.

The client component 208 is usually downloaded from the server 102 to a client computer 104 located remotely. The client component 208 runs on the client computer 104 and communicates with the server component 202 through the server interface manager 210 via data messages or other suitable communications means. The server interface manager 210 makes requests for information to the server component 202 and stores the information received in proper libraries. The audio manager 212 is responsible for retrieving audio files from the audio library 224 and playing them on audio devices. The display manager 214 is responsible for retrieving graphic files and displaying them on a display device. The graphic files are stored, depending on their nature, in the black-and-white library 222, the color library 216, and the balloon library 220. The balloon library 220 is also known as detail information library.

In an alternate embodiment, the digital publishing system may be one single piece of software running on a single computer. The digital publishing system may be stored in a computer readable disk and loadable onto the computer system or loaded into the computer memory.

Figure 3:
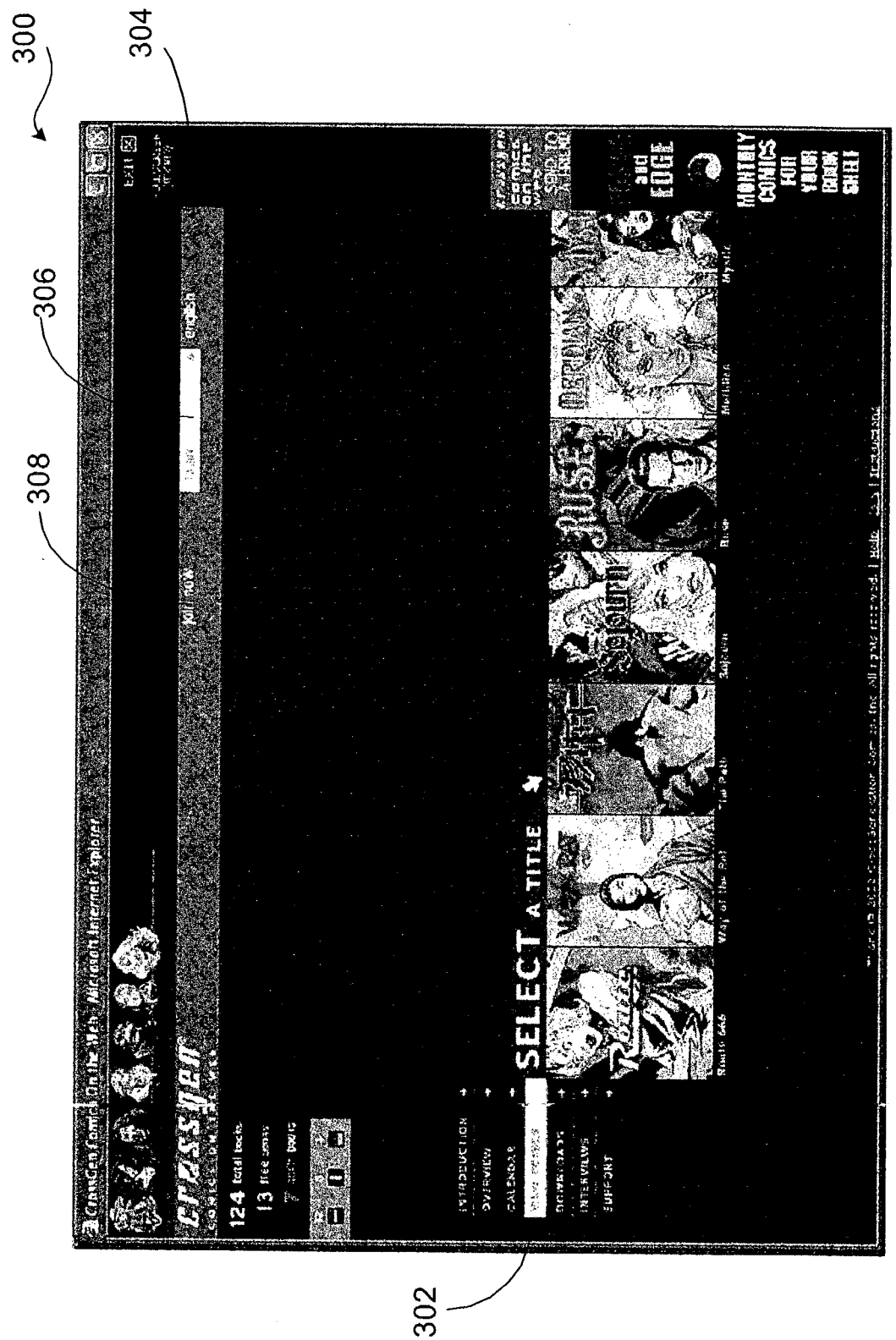
FIG. 3 shows an initial screen displayed in one embodiment of the invention.

According to one embodiment, the invention employs a display screen to present the digital information to a user. FIG. 3 illustrates an initial screen 300 displayed to the user. When the user starts the program by either invoking the software on a computer or visiting a web site, the initial display screen 300 is displayed to the user. The initial display screen 300 has an action menu 302, from where the user can enter his desired action. The initial display screen 300 also has a tool bar across a portion of the screen. The tool bar has a language button 304 that allows the user to choose the language for the action menu 302. The tool bar also has a login button 306 for the user to login if the user is a regular subscriber. If the user is not a regular subscriber, he can subscribe to the service using the subscription ("join now") button 308.

When the user selects "view comics" button from the action menu 302, a list of available titles are displayed across the display screen. By moving a cursor horizontally across the display screen, the list of titles moves in the opposite direction of the cursor. By moving the list of titles this way, more titles can be displayed on a small screen and the user does not need not to use a scroll bar to view additional titles.

Figure 4:
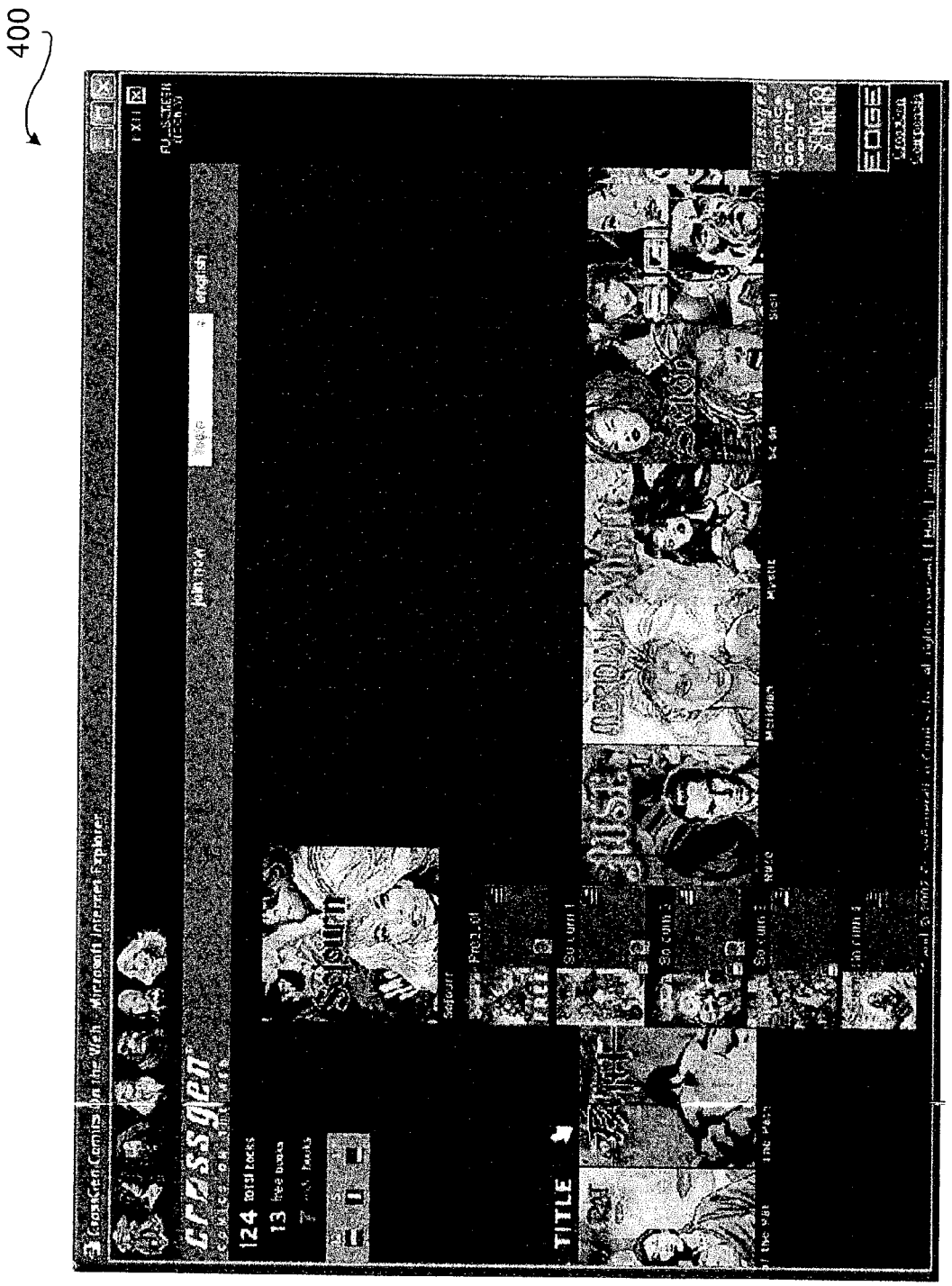
FIG. 4 shows a title selection screen displayed in one embodiment of the invention.

FIG. 4 illustrates a title selection screen 400, from which the user selects one of the titles. After the user selects one of the titles, all the available chapters of that title are displayed vertically 402. The user can then proceed to select a desired chapter. For non-subscribers, only a few chapters may be available for viewing, while subscribers may view all the chapters.

Figure 5:
FIG. 5 shows an introductory display screen displayed in one embodiment of the invention.

FIG. 5 illustrates an introductory display screen 500. The introductory display screen 500 presents the title of the chapter selected to the user and briefly instructs basic commands to the user. The introductory display screen 500 presents several help balloons 502 to the user. It also has a display feature bar 504 and an information bar 506. The help balloons 502 will disappear after the user clicks the cursor anywhere on the introductory display screen.

The display screen may have a control bar (not shown) that expands itself when a cursor moves on the top of the control bar. Besides expanding itself, the control bar also moves to the left or to the right of the display screen depending on the cursor's movement.

Figure 6:
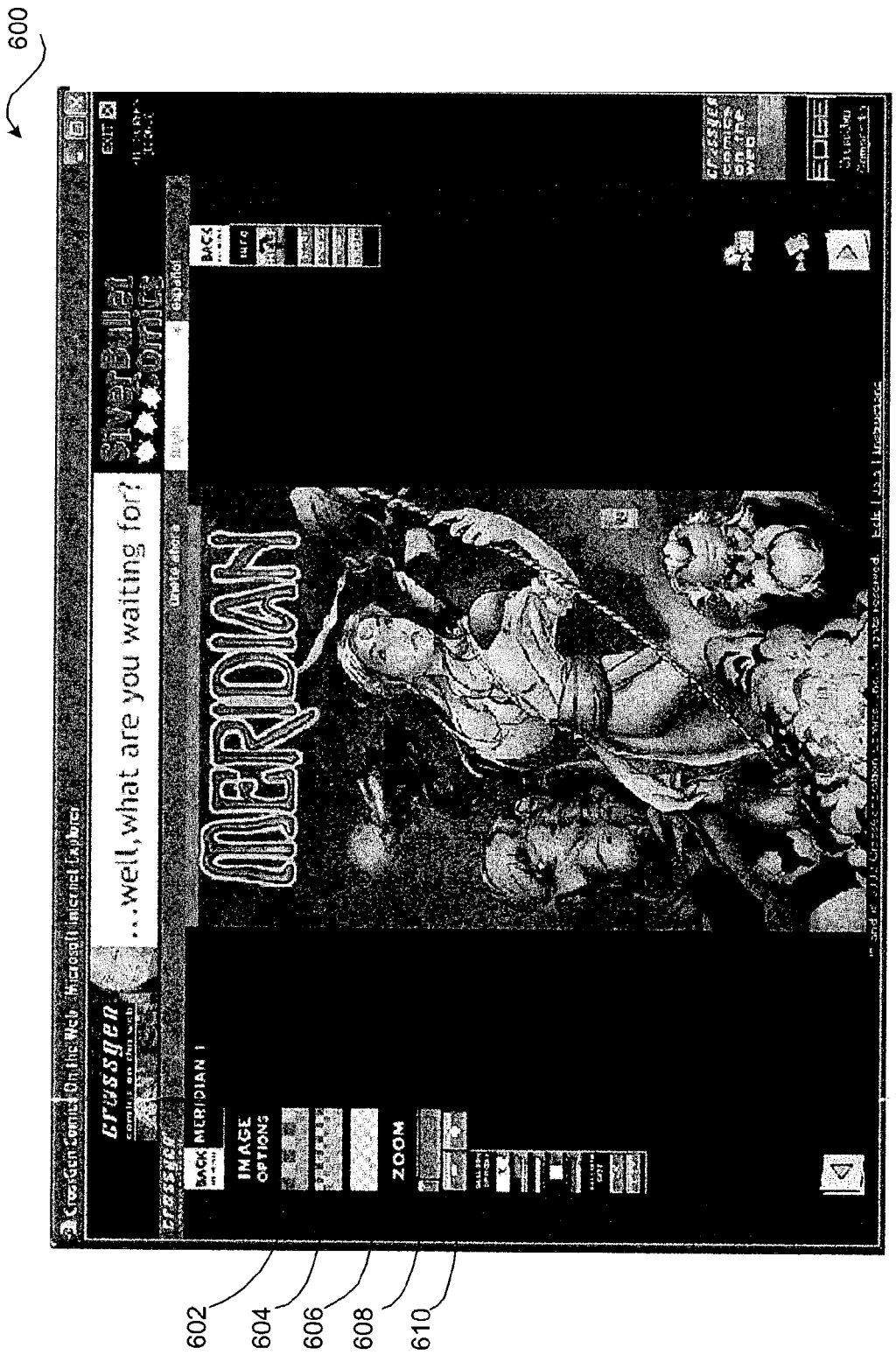
FIG. 6 shows a plurality of feature buttons on the introductory display screen displayed in one embodiment of the invention.
Figure 7:
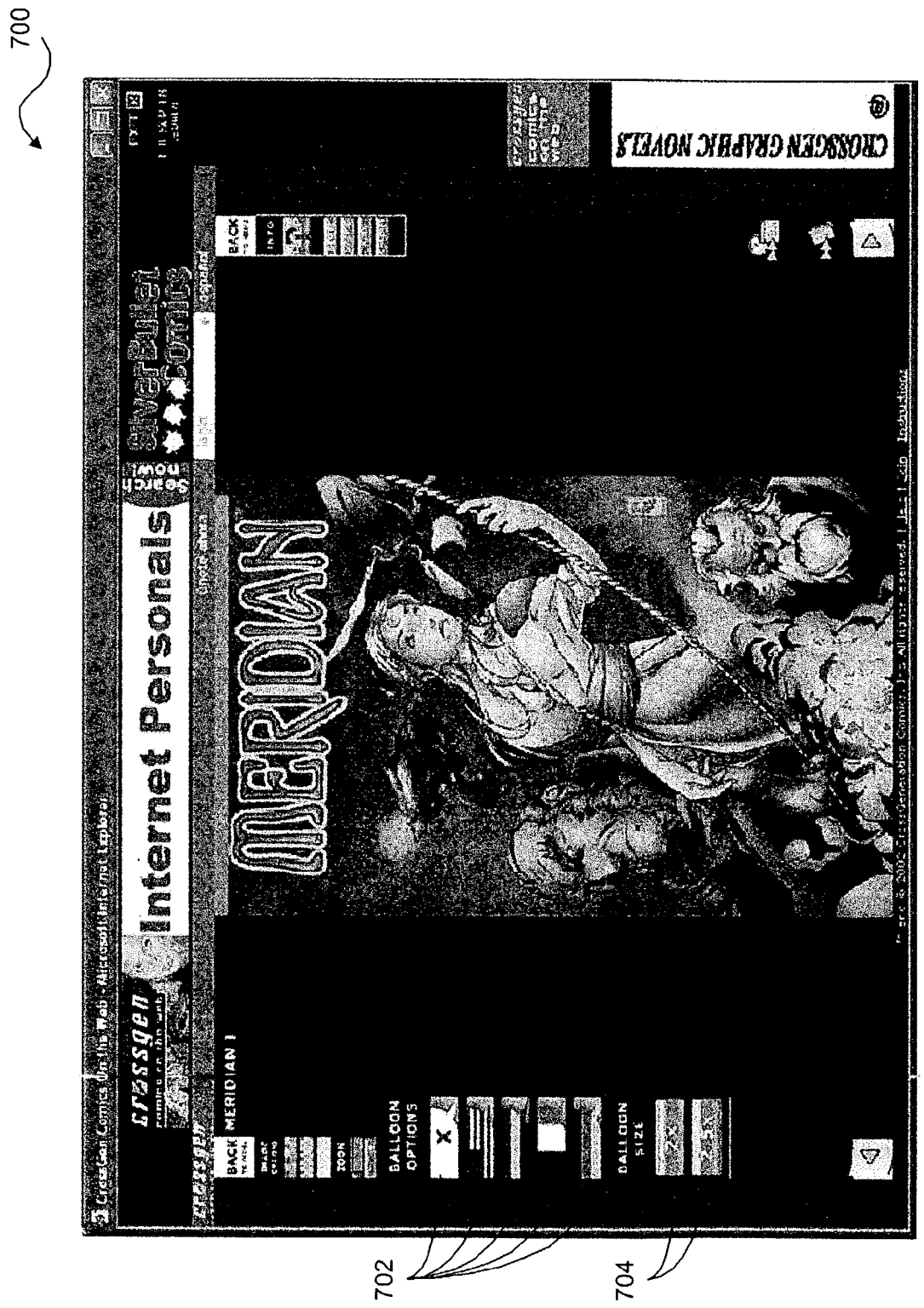
FIG. 7 shows a second set of feature buttons on the introductory display screen displayed in one embodiment of the invention.

The feature bar 504 also presents several feature buttons 602-610 to the user. The user can adjust his digital information reading experience using these feature buttons as shown in FIG. 6. The feature buttons 602-610 control image quality of the digital information in display. The user may change the graphic display to a high resolution image, a low resolution image, or a black-and-white image by activating feature buttons 602, 604, or 606 respectively. When the user changes the image quality, the image is replaced by the selected image quality as are all subsequent pages. The user may also zoom in or out of the display image by using "+" or "−" buttons 610. The user may also zoom in or out by using the sliding button 608.

The feature bar 504 also presents a second set of feature buttons 702 and 704 that allow the user to change the appearance of dialog balloons. The user may change the size of the dialog balloons through buttons 704, and he may also change the content of dialog from one language to another by selecting the desired languages through buttons 702. The dialog balloons are not drawn into the image. The dialog balloons are layered on the top of the images, and they can be substituted freely by dialog balloons with different languages. In an alternative embodiment, not shown in figures, the user may modify the expansion speed of the dialog balloons.

Figure 8:
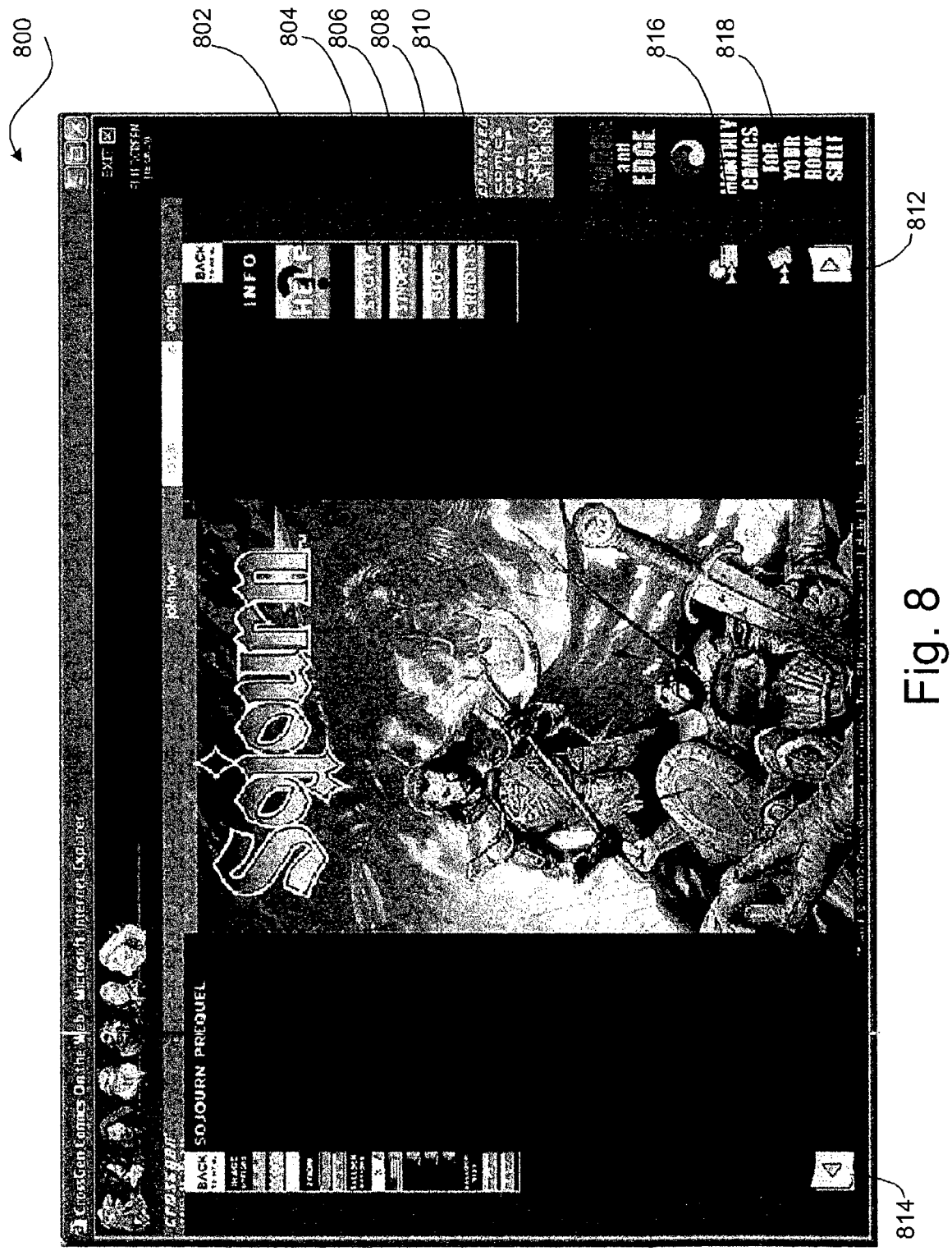
FIG. 8 shows an information bar on the introductory display screen displayed in one embodiment of the invention.

The information bar 506 has several feature buttons 802-810, as shown in FIG. 8, that provides help and information about the digital information that is being displayed. If the user activates the help button 802, help balloons 502 will be displayed. The user can learn about the story of the digital information in display up to that moment by activating the story feature button 804, and a story balloon will be displayed. The user can also learn about the summary of the selected story through a synopsis feature button 806 or the user can learn about the characters in the selected story through a character biography button 808. Finally, the user can learn about the creators of the story by activating a credits button 810.

On each screen there is one right navigation button 812 and one left navigation button 814 that let the user move the story forward and backward respectively. When the user activates the right navigation button 812, a new page of digital information is loaded. Generally, the system buffers only two pages of digital information ahead of what is being displayed. For example, if the system is displaying page 3, then the system buffers pages 4 and 5. When the user moves the display to page 4, page 6 is loaded into the buffer. This way the use of the buffer is limited and time spent on file transfer is reduced. The user may also move to the next book of the same title by using button 818, or move to the next book by the release date by using button 816.

Figure 9:
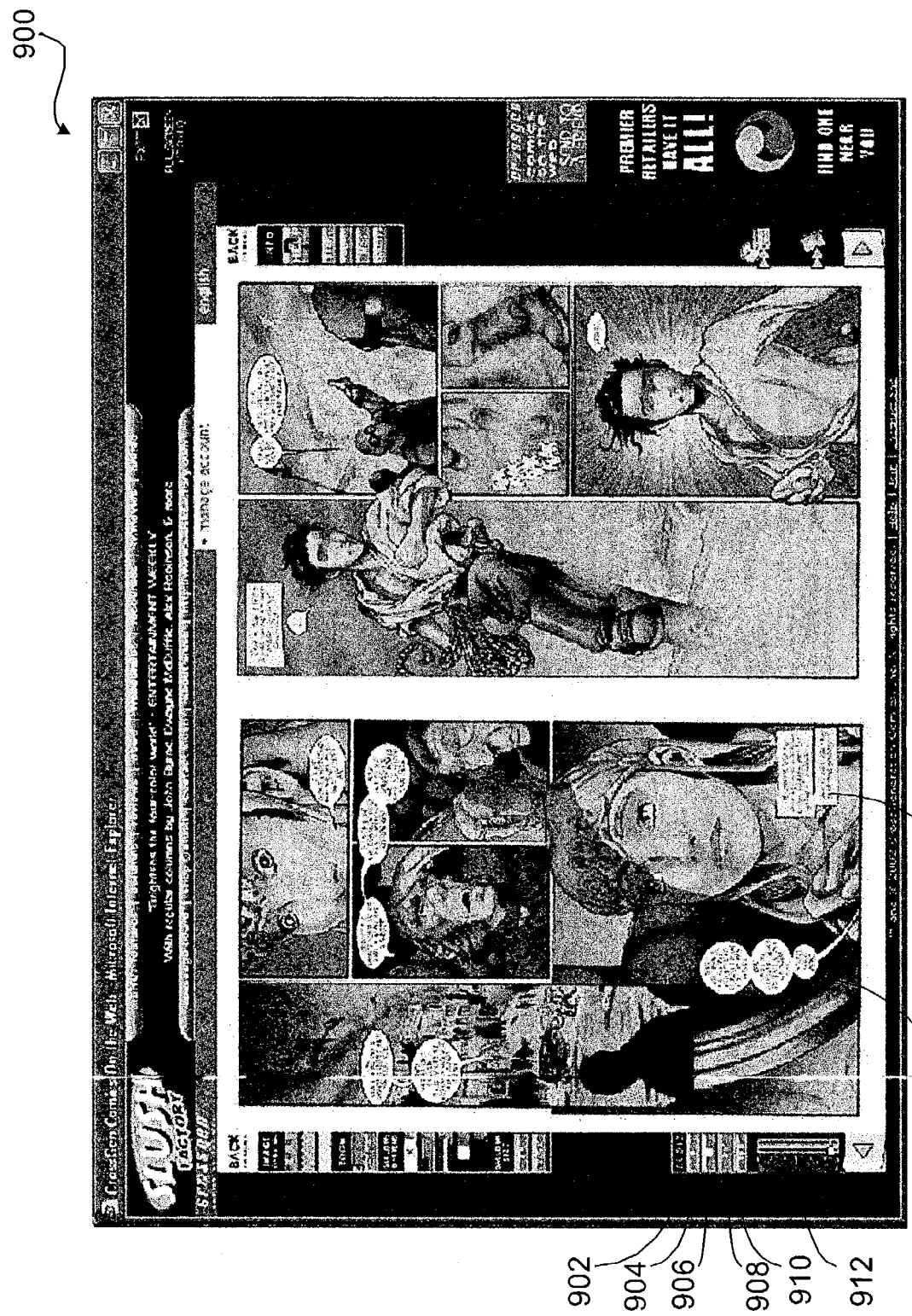
FIG. 9 shows a story display screen displayed in one embodiment of the invention.

The user may also choose to listen to the dialogs narrated, instead of reading it, by enabling an audio selection bar 902 shown in FIG. 9. When this audio feature is enabled, the user may play the audio files on an audio device, for example a speaker, by activating button 904 or stop the audio by activating button 906. The user may also set the audio to play all the dialogs of the current display automatically by enabling button 908. The digital information in display will automatically turn to the next page if the user enables button 910, which automatically turns the page when the audio is done. The audio file is pre-recorded by actors playing the characters. The sliding bar 912 shows the loading of the audio file and the percentage of audio file played so far.

FIG. 9 also illustrates dialog balloons 914 and description boxes 916. The dialog balloons 914, which display text detail images, reflect the words spoken by a particular character in the story, and the description boxes 916, which also display text detail images, provide a background description of the story at that moment. Both dialog balloons and description boxes can alter their appearance when a cursor is placed on the top of them. The dialog balloons 914 and the description boxes 916 are placed as layers on the top of the display screen independently from the underlying pictorial display. When a cursor is placed on the top of a dialog balloon, the same dialog balloon is displayed at a bigger scale on the top of the display screen without affecting the underlying pictorial display, thereby facilitating easy reading of the dialog.

Figure 10:
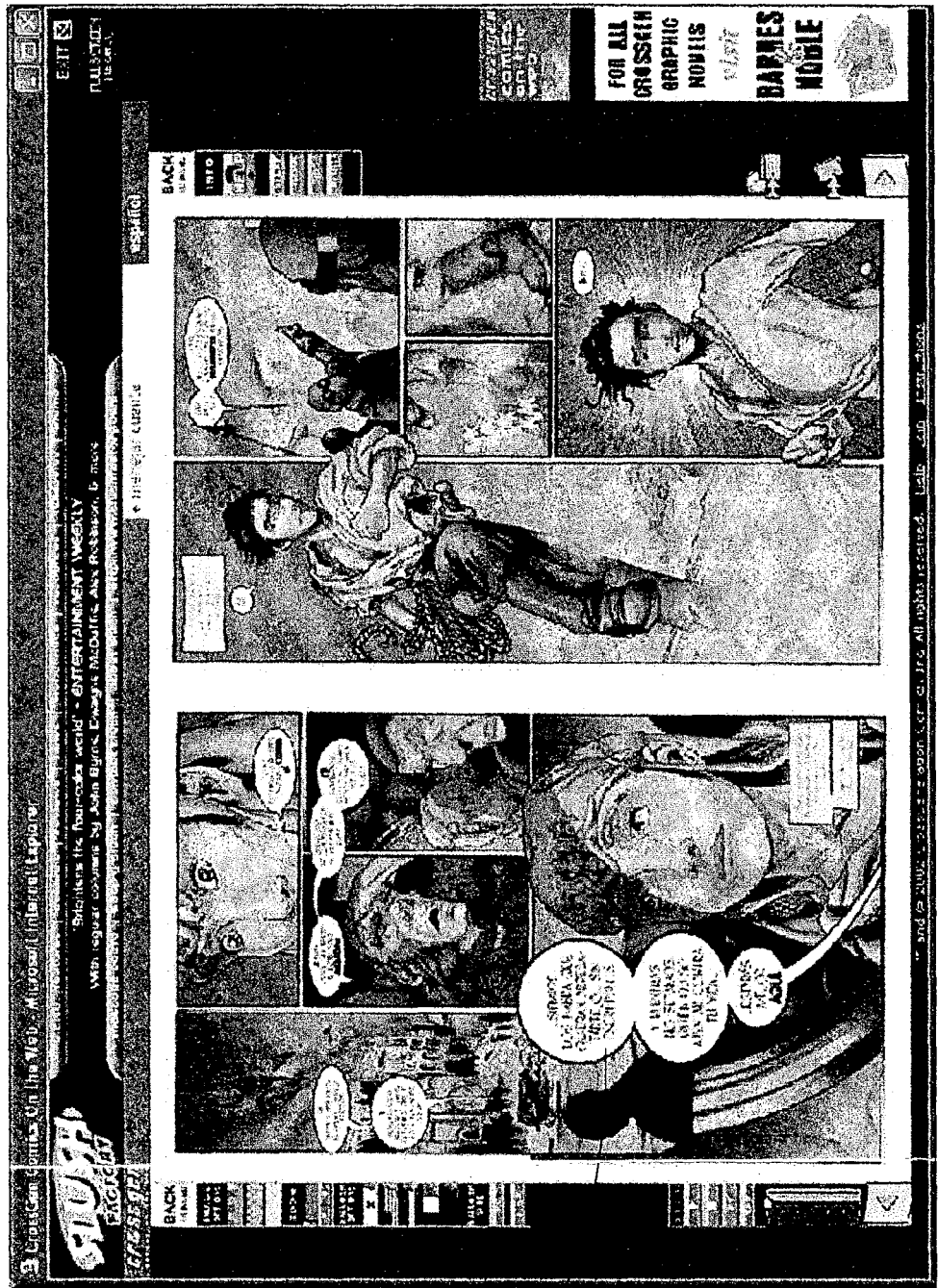
FIG. 10 shows a second view of the story display screen shown in FIG. 9.

FIG. 10 illustrates a magnified dialog balloon. When the user rolls the cursor on the top of a dialog balloon, the selected balloon 1002 automatically magnifies its size to provide easy reading to the user without the user clicking the mouse. The user can select the size of the expanded dialog balloon through buttons 704. The expanded dialog balloon 1002 also illustrates the dialog may be changed from English to another language, in this case Spanish. The user may select a different language for the dialog balloons using the language button 304. When the user changes the language selection from English to French through a language button on the control bar, all the dialog balloons and descriptions are changed to French. The user can mix the audio feature and the language feature. The user can read dialogs in English while listening to the same dialog in French.

For example, the user can select one comic book from a selection of several titles by clicking on the selected title. After selecting a comic story, the user can select an image quality for viewing the comic story by using the feature buttons 602-606 on the display feature bar 504. He can select low quality through feature button 602 or high quality through feature button 604. He may also choose to view the comic book in basic ink quality through feature button 606. The image quality affects the information downloading speed. The high quality may require a larger file and longer downloading time. The cover of the comic book is displayed along with help balloons 502. The help balloons 502 are in the format of dialog balloons pointing to different display areas and command buttons.

After activating the right navigation button 812, the system presents the inside cover and the first page to the user. The inside cover may contain advertisements and links to the advertiser's Internet site. The comic story may be displayed as two pages on each display screen: the left page and the right page. The display screen can be used as a single display page when needed.

When the user activates the right navigation button 812 to move to the next page, the system requests additional pages to be downloaded from the server 102. For example, when the user moves to pages 3 and 4, the system requests the digital information for pages 5 and 6 be downloaded from the server. Other subsequent pages, such as pages 7 and 8 are not downloaded until pages 5 and 6 are displayed. This downloading scheme eases the network traffic and avoids long waiting time for the user.

There are several independent files that are downloaded from the server for a given page. In one embodiment, there is a black-and-white file (also known as an ink file), a color file, a description file, dialog files, and an audio dialog file. There may be several dialog files, one for each language supported. These files are displayed independently onto the display screen. When the user is viewing the story in the black-and-white mode, the color file is not displayed. When the user is reading in English, the French dialog file will not be displayed.

The invention is also suitable for displaying other information. In one alternative embodiment, the present invention is used to display technical manuals for technicians, such as at an auto repair facility. The technical manuals can be loaded on the computer from a computer readable disk. A technician can select a vehicle model, for example, Ford Taurus, model year 2000. After selecting the vehicle model and the model year, the technician can select a particular technical area, for example the engine. Several aspects of the engine can be displayed in different pages on the display screen and the user can navigate through them by using the navigation buttons. On each page, there may be description boxes providing general description, and there may also be detail displaying balloons, which are similar to dialog balloons, displaying details of a particular component. The detail displaying balloon may be expanded to provide further detail and the detail displaying balloon may also be expanded to provide an exploded view of the component or a rotating view of the component.

If the technician is located in a Spanish-speaking country, then he can change the language to Spanish for ease of understanding. The technician may also use the information bar features to learn more about a particular component. For example, the information bar may allow the technician to learn exact tuning criteria for the engine operating in idle or to learn an equivalent replacement part. The technician may also use the audio bar 902 to assist his work. The manufacturer of the technical manuals may include audio files for sound bites of an engine with incorrect timing or tuning as the way to help the technicians to properly identify the problem areas.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method for displaying an illustrated book on a computer screen, comprising:
   displaying a static underlying graphics image containing one or more illustrations and corresponding to contents of a page in the illustrated book on the computer screen;
   displaying a text detail image having text therein on the computer screen as a layer on top of the static underlying graphics image and covering a first portion of the static underlying graphics image, the text detail image being defined as at least one of a word balloon, a dialog balloon or a description box; and
   responsive to a cursor rolling over the text detail image, dynamically re-sizing the text detail image by magnifying the text detail image such that the text detail image covers a second, larger portion of the static underlying graphics image;
   wherein content of the static underlying graphics image is not adjusted responsive to magnifying the text detail image; and
   wherein another text detail image layered on top of the static underlying graphics image but not having the cursor located therein is not re-sized.

2. The method of claim 1, where the illustrated book comprises a comic book.

3. The method of claim 1, wherein the text detail image comprises a dialog balloon.

4. The method of claim 1, further comprising:
   receiving an indication of a selected language in which a user desires to read the illustrated book; and
   displaying the text detail image in the selected language.

5. The method of claim 1, further comprising:
   receiving a selected size selection for the text detail image; and
   magnifying the text detail image to the selected size when the cursor has rolled over the text detail image.

6. The method of claim 1, wherein the step of displaying the static underlying graphics image further comprises:
   displaying a black and white image corresponding to the static underlying graphics image; and
   displaying a color image as a layer on top of the black and white image.

7. The method of claim 6, further comprising:
   receiving an indication that a user desires to view the static underlying graphics image in black and white; and
   ceasing to display the color image upon receiving the indication.

8. The method of claim 1, further comprising:
   receiving a selected image resolution selection from a user; and
   displaying the static underlying graphics image in the selected image resolution.

9. The method of claim 1, further comprising:
   receiving a selected zooming selection from a user; and
   displaying the static underlying graphics image in the selected zooming selection.

10. A method for displaying an illustrated book on a computer screen, comprising:
    displaying a static underlying graphics image containing one or more illustrations and corresponding to contents of a first page in a book on the computer screen;
    displaying a text detail image having text therein on the computer screen as a layer on top of the static underlying graphics image and covering a first portion of the static underlying graphics image, the text detail image being defined as at least one of a word balloon, a dialog balloon or a description box;
    responsive to a cursor rolling over the text detail image, dynamically re-sizing the text detail image by magnifying the text detail image such that the text detail image covers a second, larger portion of the static underlying graphics image; and playing, on an audio device, a portion of an audio file corresponding to the text detail image in the first page of the book, in which the audio file is a narrative of the book;

wherein content of the static underlying graphics image is not adjusted responsive to magnifying the text detail image; and wherein another text detail image layered on top of the static underlying graphics image but not having the cursor located therein is not re-sized.

11. The method of claim 10, further comprising:

advancing to a second page of the book when the audio device has finished playing the portion of the audio file corresponding to the text detail image in the first page of the book; and playing a portion of the audio file corresponding to a text detail image in the second page of the book.

12. The method of claim 10, wherein the illustrated book comprises a comic book.

13. A method for displaying an illustrated book on a computer screen, comprising:

displaying a static underlying graphics image containing one or more illustrations and corresponding to contents of a page in the illustrated book on the computer screen;

displaying a text detail image having text therein on the computer screen as a layer on top of the static underlying graphics image and covering a first portion of the static underlying graphics image, the text detail image being defined as at least one of a word balloon, a dialog balloon or a description box; and responsive to positioning a cursor over the text detail image, dynamically re-sizing the text detail image such that the text detail image covers a second, larger portion of the static underlying graphics image;

wherein content of the static underlying graphics image is not adjusted responsive to magnifying the text detail image; and wherein another text detail image layered on top of the static underlying graphics image but not having the cursor located therein is not re-sized.

14. The method of claim 13, wherein the illustrated book comprises a comic book.

15. The method of claim 13, wherein the text detail image comprises a dialog balloon.

16. The method of claim 13, further comprising:

receiving an indication of a selected language in which a user desires to read the illustrated book; and displaying the text detail image in the selected language.

17. The method of claim 13, further comprising:

receiving a size selection for magnifying the text detail image; and magnifying the text detail image to the selected size when the cursor is positioned over the text detail image.

18. The method of claim 13, wherein the step of displaying the static underlying graphics image further comprises:

displaying a black and white image corresponding to the static underlying graphics image; and displaying a color image as a layer on top of the black and white image.

19. The method of claim 18, further comprising:

receiving an indication that a user desires to view the static underlying graphics image in black and white; and ceasing to display the color image upon receiving the indication.

20. The method of claim 13, further comprising:

receiving a selected image resolution selection from a user; and displaying the static underlying graphics image in the selected image resolution.

21. The method of claim 13, further comprising:

receiving a selected zooming selection from a user; and displaying the static underlying graphics image in the selected zooming selection.

* * * * *